Patented July 27, 1926.

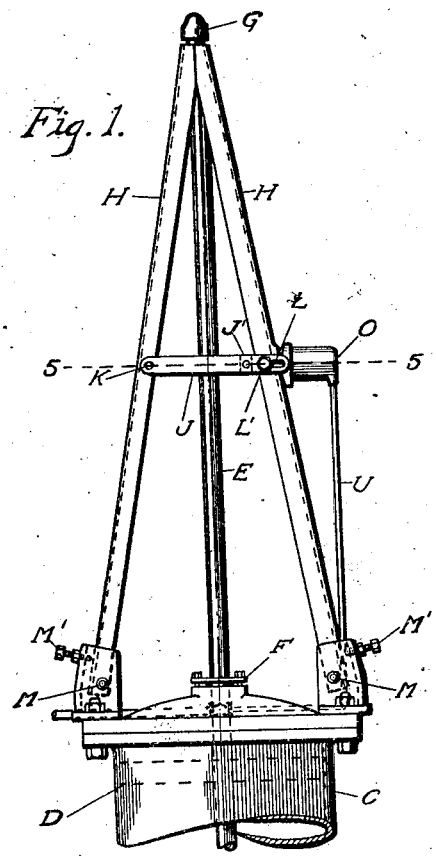
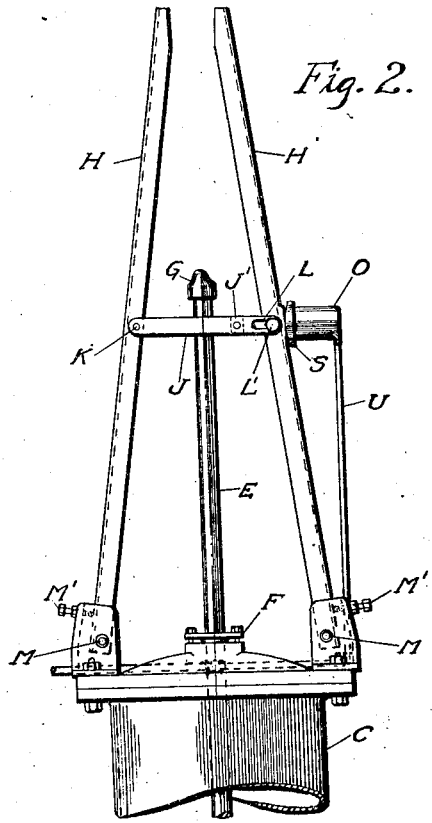
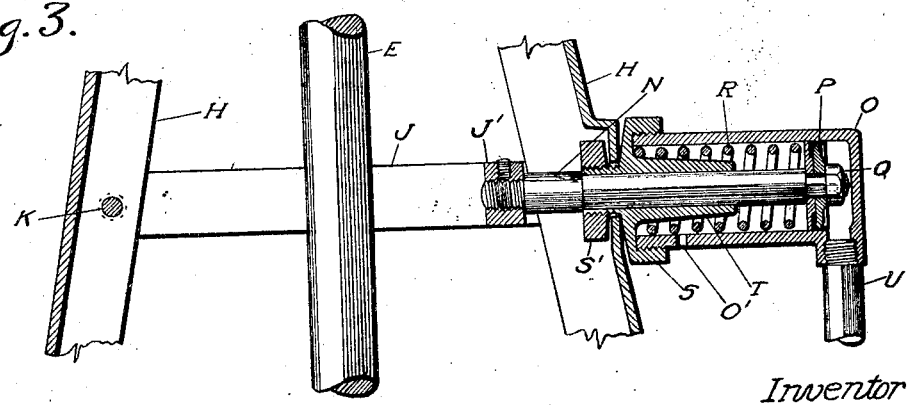

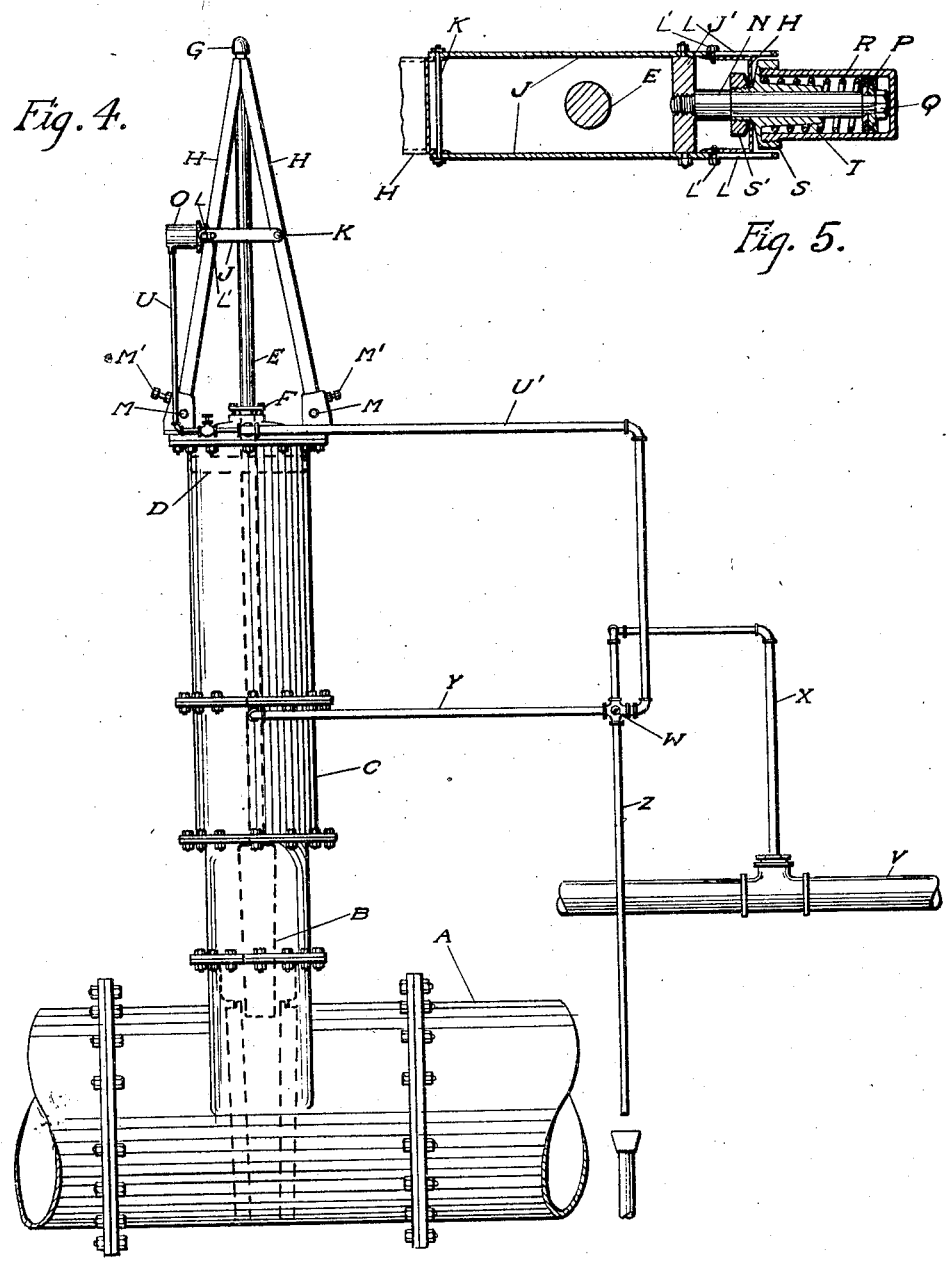

1,594,330

UNITED STATES PATENT OFFICE.

FRANK F. FISHER, OF DETROIT, MICHIGAN.

AUTOMATIC LOCKING MEANS FOR HYDRAULICALLY-OPERATED VALVES.

Application filed December 31, 1924. Serial No. 759,056.

This invention relates to an automatic locking means for hydraulically operated valves, and has for its object an improved organization of parts by means of which such valves may be automatically locked in open position to prevent closure in case of failure of the actuating water pressure. The release mechanism is hydraulically interlocked with the closing side of the valve actuating cylinder and thus does not in any way interfere with the ordinary operation of the valve in case it is desired to actuate it to position of closure. This device may thus be built as an integral part of the valve proper and the four way valve controlling the movement of the main valve may be placed in any convenient position. It is of particular utility in connection with large power plants wherein under ordinary conditions a large volume of water per unit of time passes through a relatively large pipe or conduit, and it is desired that no interference therewith should occur so long as the flow of circulating water is to continue. And, should the valve-actuating pressure fail for any cause, the continued open position of the valve is imperative. For clearness and simplicity of description, I will refer to this control mechanism as hydraulically operated, but it is of course obvious that pneumatic control means could be substituted for the hydraulic means described, and I desire the scope of this disclosure to be understood accordingly.

In the drawings:

Figure 1 is an elevation of the upper end of the gate valve housing and of my improved stem-catching mechanism positioned thereabove, the same being in closed position.

Figure 2 is a similar elevational view with the parts in open or stem-releasing position.

Figure 3 is a sectional detail elevation, on a larger scale than that of Figure 2, showing the operation of the spring-held piston relatively to the inclined riser members of the mechanism shown in Figures 1 and 2.

Figure 4 is an elevational view of my device as applied to a section of pipe in which a gate valve is located, and showing as well the auxiliary hydraulic or pneumatic connections for operating this spring-held piston.

Figure 5 is a cross-sectional view along the line 5—5 of Figure 1 and looking in the direction of the arrows there shown.

A indicates a conduit of relatively large diameter, in which is locked a gate valve B, the enclosing shell C of which contains the piston D, from which the stem E rises through the suitably apertured and stuffed terminal closure F. The upper end of the stem is notched or headed, as at G, as well as being bluntly pointed at its tip end, so that when it rises sufficiently high to be forced between the meeting upper ends of the inclined channel bar braces H, these being yieldingly held together as will be shortly explained, the stem can not fall so as to effect the closure of the gate valve unless and until these meeting ends of the braces are moved apart sufficiently to permit the notched or shouldered tip G to pass between them. Thus, under ordinary service conditions, when the gate valve is desired to be continuously open, it is automatically so held.

Each of the inclined brace members H is loosely pivoted at its lower end, as at M, to the top of the shell C. The resilient holding of these inclined brace members is effected through the medium of the links J tied together by the crosshead J' whose members flank the stem E, as brought out especially in Figure 5. These with the brace members H form an A-shaped construction, each of which is pivoted at one end to one of them, as at K, whereas the other end of each is slotted, as at L, to permit the relative movement of the braces to open and closure position as described, thus serving as guiding and limiting elements for the brace members H. From this crosshead J' there extends an inserted stem N, which passes through a suitable aperture in the channel wall, and beyond into the piston chamber O, where its tip end is crowned by the nut Q, by means of which the piston P therein is held against the spring R, whose other end is held against yielding by means of the cap nut S, fastened movably to the brace H by means of the nut S'; the cap nut S is preferably formed with an integral elongated collar T, which serves as a bearing for the limited sliding movement of the stem N into the outer end of the cylinder O. The centering of the braces H relatively to the stem E is provided for by means of the set screws M'. Beyond the piston P leads a pipe U, which is connected with the pipe U', which in turn is connected with an auxiliary though independent hydraulic source, as for example the pipe V. The take-off or branch pipe X of this latter has interposed between it and the pipe U the four-way valve W, by means of which the hydraulic pressure through the pipe V may be directed either into the pipe U' above the piston D or into the pipe Y whose terminal enters the cylinder C, below the piston D. A waste pipe Z may also be connected with the four-way valve for the release from the auxiliary hydraulic system of the surplus actuating water. There is also provided in the shell of the cylinder O a vent hole O' to provide against either water-binding (or air-binding) of the piston P in case of leakage past it into the cylinder O in the course of service.

The theory and operation of this device is as follows: The desired position of the gate valve B during normal operation being the open one, the piston D carrying the stem E is raised, as by turning the four-way valve W, so that the hydraulic pressure that it controls may enter the cylinder C through the pipe Y below the piston D. This connects the space above the piston D, pipes U and U' and piston chamber O with the waste pipe Z, thus releasing it from all pressure, and thus bringing the device entirely under the control of the spring R. The shouldered tip G of the valve stem is forced through the meeting upper ends of the channel braces H, which latter, being yieldingly drawn toward one another by the pull of the spring R, serve to prevent the fall of the valve stem and thus leave the flow through the conduit A uninterrupted. When or if, however, the flow through the conduit is to be interrupted, the four-way valve W may be operated to bring the pressure from the auxiliary hydraulic system V through the pipe U' against the top of the piston D and with it through pipe U against the outer head of the piston P, thus forcing it against the spring R sufficiently to permit the cessation of the yielding pull upon the channels H, to a degree that will permit them to fall apart enough for the head G of the stem E to pass between them, thus permitting the fall of the stem and consequently effecting the closure of the gate valve B.

What I claim is:

1. In combination with the stem of an hydraulic valve, a pivotally supported pair of inclined brace members rising on either side thereof, the meeting upper ends of said members being adapted to cooperate in holding said stem against falling after it has been raised therebetween, a spring-held piston for yieldingly holding said brace members in such holding position, and hydraulic means operable from an external source whereby the action of said spring-held piston on said brace members may be modified to permit the fall of said hydraulic valve stem.

2. In combination with a conduit gate, a piston and stem for operating the same, the projecting outer end of said stem being headed, a pair of flanking brace members each pivotally mounted at one end and slidably engaging said stem with their adjacent upper ends, means for yieldingly drawing said brace members toward one another and into interlocking position relatively to the headed end of said stem, and pneumatic means independent of that controlled by said gate, whereby the draw of said spring may be regulatably varied, thereby permitting the fall of said stem from between said brace members and effecting the downward actuation of the piston to cause the closure of its gate valve.

3. The combination, with a headed valve stem, of a pair of brace members adapted to lockingly engage under the head of said stem when the same is in raised position, a spring-held link adapted to normally draw said brace members toward one another into such locking position, and remotely operable pneumatic means for varying the pull of said link upon said brace members, thereby permitting their swing away from engagement with said stem to a degree sufficient to permit its fall from its locked position between them.

4. An automatic locking mechanism for hydraulically operated valves, comprising a headed valve stem provided with a piston intermediate its ends and a gate valve on its opposite end from the headed portion, a conduit provided with a complementarily formed seat for said gate valve, a cylinder housing said parts and through one end of which the headed end of the valve stem slidably engages, a pair of limitedly movable brace members pivotally supported above said cylinder in flanking position with respect to said headed valve stem and in position to engage with their free ends under the headed portion thereof when said stem is in raised position, a spring-held cross piece adapted to normally hold said brace members in locking position with respect to said headed valve stem, thereby maintaining the continued open position of its gate valve, and means operable from an external point whereby the pull of said spring-held cross piece upon said brace members is overcome, thereby terminating the action of the latter in holding said headed valve stem in raised position and permitting its gate valve portion to move to closure position relatively to said conduit.

5. In combination with a pair of pivoted detent members for cooperatively holding the stem of a valve in raised position, spring-actuated means for drawing said members toward one another to effect such holding of the stem, and remotely operable pneumatic means for overcoming the pull of said spring-actuated means, to permit the fall of said stem from its position of engagement by said detent members.

6. In combination with an hydraulic valve stem, a pair of pivoted brace members whose free ends are adapted to swing into and out of engagement with said valve stem, means for yieldingly drawing said brace members into holding position relatively to said valve stem when the latter is in raised position, and externally operable pneumatic means for actuating said brace members away from one another to effect the release of said valve stem from their holding engagement, thereby permitting its movement to closure position.

In testimony whereof, I sign this specification.

FRANK F. FISHER.